E. C. NEWTON.
AUTOMATIC REGULATING VALVE FOR INTERNAL COMBUSTION ENGINES.
APPLICATION FILED SEPT. 8, 1914.

1,229,500.

Patented June 12, 1917.

Witnesses
G. T. Baker
B. M. Kent

Inventor
Edward C. Newton
by Foster Freeman Watson & Coit
Attorneys

UNITED STATES PATENT OFFICE.

EDWARD C. NEWTON, OF MARYSVILLE, CALIFORNIA.

AUTOMATIC REGULATING-VALVE FOR INTERNAL-COMBUSTION ENGINES.

1,229,500.  Specification of Letters Patent.  Patented June 12, 1917.

Application filed September 8, 1914. Serial No. 860,684.

*To all whom it may concern:*

Be it known that I, EDWARD C. NEWTON, a citizen of the United States, residing at Marysville, county of Yuba, State of California, have invented certain new and useful Improvements in Automatic Regulating-Valves for Internal-Combustion Engines, of which the following is a specification.

This invention relates broadly to devices for controlling the flow of a fluid through a conduit and more specifically to governing devices for internal combustion engines. In accordance with the present invention the speed of the engine is controlled by automatically controlling the flow of mixture from the carbureter to the engine so that when the engine speed exceeds the predetermined normal the supply of mixture or motive fluid will be reduced so as to reduce the speed of the engine.

While the invention is designed with special reference to use in connection with internal combustion engines, it will be understood that it may be used in other relations for controlling the flow of a fluid through a conduit and therefore I do not wish to limit the invention to the specific application thereof referred to.

One embodiment of the invention is illustrated in the accompanying drawings, in which, Figure 1 is a side elevation of a conduit connecting a carbureter with the intake pipe of an internal combustion engine;

Figure 1:
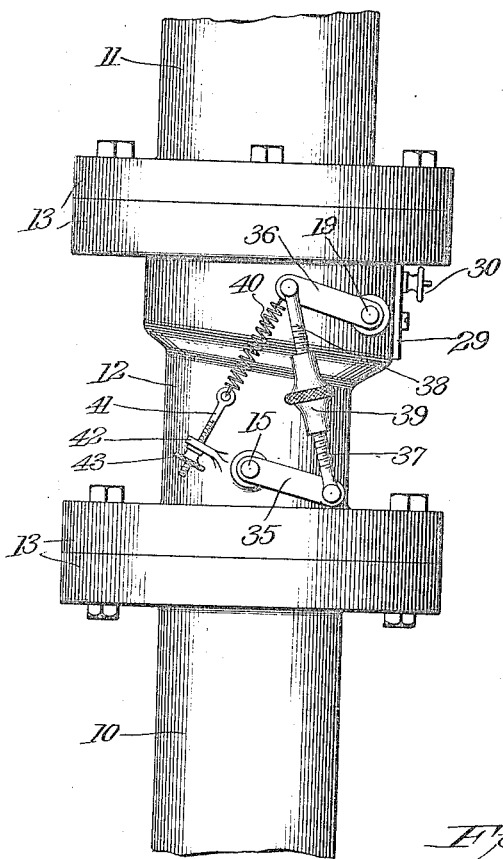

Referring to the drawings, 10 indicates a pipe or conduit leading from the usual carbureter (not shown) and having the usual manually controlled throttle 10'. A conduit 11 leads to the intake manifold of the engine (not shown). The intermediate section 12 of the conduit is secured to the sections 10 and 11 in any suitable manner, as by means of the flanges 13 which may be bolted together or secured in any preferred manner.

Within the section 12 of the conduit there is pivoted a butterfly valve 14, this valve being on a shaft 15 and, as will be readily understood, the valve is so balanced that there is practically no tendency of the fluid flowing through the conduit to open or close the valve. The valve 14 may be provided with the usual restricted openings 16 to permit a slight flow through the valve when the latter is in the closed or dotted position shown in Fig. 2. Within the conduit section 12 there is a shoulder or seat 17 for a grid valve member 18 which is pivoted at 19. Resting on the valve member 18 is a grid member 20 having openings 21 which are adapted to register with the openings 22 in the valve 18 when the latter is on the seat 17. For the purpose of yieldably holding the grid 20 against the valve member 18, the latter is provided with a slot 23 through which a screw 24, secured to the grid, projects. On the under side of the valve 18 there may be arranged a plate 25 having an opening for the screw 24 and resting against this plate is a leaf spring 26, which is also engaged by a nut 27 on the screw 24. The plate 25 and spring 26 may slide to and fro on the under side of the valve 18 with the grid 20.

Secured to the side of the section 12 and covering an opening 28 therein is a plate 29 in which there is rotatably secured a nut 30. A threaded rod 31 is arranged in the nut 30 and carries a pivot pin 32. A connecting rod 33 extends from the pivot 32 to a pivot 34 on the grid 20 and from Fig. 2 it will be evident that when the valve 18 swings to the dotted position the rod 33 will cause the grid 20 to be moved across the valve 18 so as to throw the ports 21 and 22 out of register and thus prevent passage of fluid through the valve. By turning the screw 30 the grid 20 may be adjusted on the valve 18 and the amount of closing of the ports through the valve may, in this way, be varied.

The shaft 15 has arranged thereon, preferably on the exterior of the section 12, an arm 35 and the pivot pin 19 has an arm 36, these arms being pivotally connected by a rod composed of the right hand threaded screw 37, the left hand threaded screw 38 and the nut 39, so that the relative arrangement of the valves 14 and 18 may be adjusted by turning the nut 39. A spring 40 has one end connected with the arm 36 and the other end connected with an eyebolt 41 which is adjustable in the abutment 42 by means of the nut 43.

Figure 2:
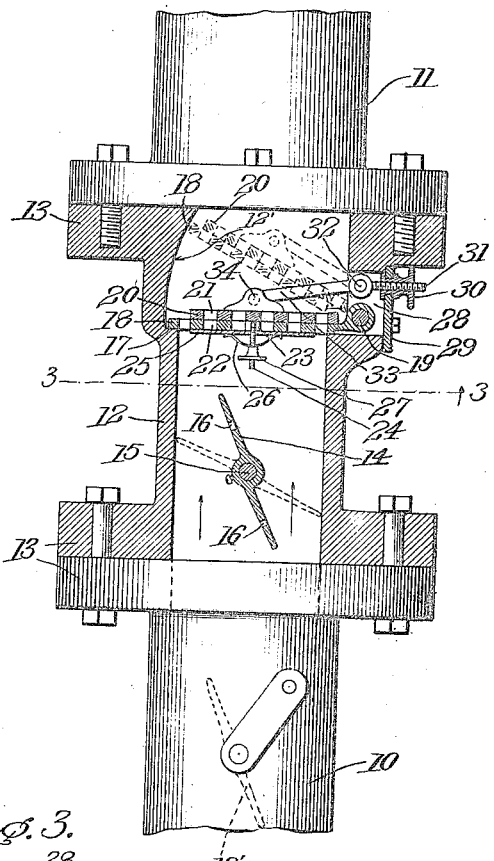
Fig. 2 is a similar view with a portion of the conduit shown in section.
Figure 3:
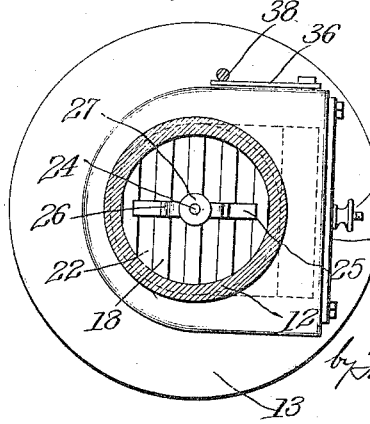
Fig. 3 is a section on the line 3—3 of Fig. 2.

In the operation of the device the flow is in the direction of the arrows in Fig. 2 and when the engine is running at a very low speed and requiring a small amount of mixture the valve 18 would be on the seat 17 and the mixture would pass through the openings or ports 21 and 22. When the engine runs at a higher speed the suction created thereby will be increased and this will induce a larger flow of mixture and a substantial difference in pressure on opposite sides of valve 18, which with the impact of the mixture on the valve will lift the latter from its seat against the action of gravity and the spring 40. As the valve 18 rises the grid 20 is moved laterally thereon so as to restrict the flow through the ports 22.

The wall of the section 12 is curved as indicated at 12' to conform to the path of the valve 18 so that passage of the mixture around the edge of the valve will be substantially prevented. The suction will increase in accordance with the engine speed and a low speed of the engine maintained at light loads by means of the manually controlled throttle 10'. Under these conditions, the pressures on the opposite sides of valve 18 will be practically equalized and this valve will remain on its seat. On increase of the load the throttle 10' will be opened and the speed of the engine will then be automatically controlled by valve 18, the limiting position of which is shown in dotted lines, and in this position the flow will be practically cut off and the engine caused to reduce its speed. As the valve 18 moves from its seat the valve 14 is gradually closed and thus the flow past this valve is restricted. The two valves thus coöperate to control the flow through the conduit and when the flow becomes excessive the valve 14 will also be practically closed. A requirement of high power at low engine speeds would be met by the valves assuming the positions shown in Fig. 2 and it will be observed that in this position the valve 14 permits a substantially full flow through the conduit although the flow past the valve 18 will be restricted, since all of the fluid must pass through the ports 22. The parts are so proportioned, however, that the requisite amount of fluid will pass through the ports 22 for conditions requiring the maximum power of the engine available at low engine speeds. As will be readily understood, the flow through the port 22, under these conditions, may be controlled by means of the adjusting nut 30. It will also be seen that in the normal operation of the engine, the valves will assume an intermediate position and will move to and from this position in accordance with the rate of flow of fluid. In this way the valves coöperate to automatically control the flow of fluid and the device is thus applicable to situations requiring the flow to be regulated and restricted to a predetermined maximum.

The valve 18 and its coöperating grid also serve as means for breaking up and atomizing globules of fuel, in case the flow is such that all these globules are not broken up and atomized in the carbureter.

Under some conditions it may be desirable to dispense with valve 14 and use the valve 18 and grid 20 alone as the means for automatically controlling the flow and it will be evident that the device is capable of use in this way.

Having thus described the invention, what I claim and desire to secure by Letters Patent is:

1. In a device of the class described, the combination of a conduit, a valve in said conduit balanced against the flow therethrough, a grid valve member pivotally mounted in said conduit, means operatively connecting said valve and member whereby one is actuated by the other, and a valve member coöperating with said grid valve member to close the openings therein as the grid valve member moves from its seat.

2. In a device of the class described, the combination of a conduit, a valve in said conduit for controlling the flow therethrough, a grid valve member operatively connected with the said valve, a second grid valve member mounted on the first grid valve member, and means whereby the ports through said grid valve members are closed as the first of said grid valve members moves from its seat.

3. In a device of the class described, the combination of a conduit, a pivotally mounted grid valve therein, a grid coöperating with said valve, a normally stationary pivot, and a rod connecting said pivot with said grid whereby the grid is moved on said grid valve as the latter is moved from its seat.

4. In a device of the class described, the combination of a conduit, a grid valve in said conduit, a grid coöperating with said grid valve to control the openings therethrough, an adjustable, normally stationary pivot, and a rod connecting said pivot with said grid whereby the latter is moved on the grid valve as the grid valve is moved from its seat.

5. In a device of the class described, the combination of a conduit, a grid valve therein, a grid coöperating with said grid valve to cnotrol the passages therethrough, an adjustable screw-threaded rod having a pivot thereon, and a rod connecting said pivot with said grid whereby the grid will be moved on said valve as the latter is moved from its seat.

6. In a device of the class described, a conduit, a valve member pivotally mounted in said conduit, a seat formed in the conduit for said valve member, the latter adapted to be moved away from its seat by fluid flowing through the conduit, yielding means opposing this movement and means, including a part carried by and coöperating with said valve member, to gradually obstruct the flow of fluid as said valve member moves from its seat.

7. In a device of the class described, the combination of a conduit, a pivoted grid therein adapted to be actuated by the flow of fluid through the conduit, and a grid slidable on the first-mentioned grid and adapted to coöperate therewith to automatically restrict the flow.

8. In a device of the class described, the combination of a conduit, a pivoted grid therein adapted to be swung by the flow through the conduit, a grid slidable on the first mentioned grid, and means whereby the second-mentioned grid is automatically caused to slide on the first to restrict the flow, as the first grid is swung.

In testimony whereof I affix my signature in presence of two witnesses.

EDWARD C. NEWTON.

Witnesses:
R. W. McCORMICK,
MABEL MARDERS.